(12) United States Patent
Hargreaves et al.

(10) Patent No.: US 12,548,116 B2
(45) Date of Patent: Feb. 10, 2026

(54) METHODS AND SYSTEMS FOR MANAGING RESOLUTION CHANGES DURING IMAGE PROCESSING

(71) Applicant: MICROSOFT TECHNOLOGY LICENSING, LLC, Redmond, WA (US)

(72) Inventors: Shawn Lee Hargreaves, Seattle, WA (US); William John Kristiansen, Duvall, WA (US); Larry Nai-Ning Chen, Bellevue, WA (US); Luke Jonathan Olsen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 59 days.

(21) Appl. No.: 18/210,469

(22) Filed: Jun. 15, 2023

(65) Prior Publication Data

US 2024/0420282 A1    Dec. 19, 2024

(51) Int. Cl.
*G06T 1/20* (2006.01)
*G06T 3/4046* (2024.01)
*G06T 3/4053* (2024.01)
*G06T 5/92* (2024.01)

(52) U.S. Cl.
CPC .............. *G06T 3/4053* (2013.01); *G06T 1/20* (2013.01); *G06T 3/4046* (2013.01); *G06T 5/92* (2024.01); *G06T 2207/20208* (2013.01)

(58) Field of Classification Search
CPC ........ G06N 3/08; G09G 5/363; G06F 3/1438; G06T 1/20; G06T 3/4046; G06T 3/4053; G06T 3/4092; G06T 5/92; G06T 2207/20208; G06T 2210/52

USPC ......................................................... 345/502
See application file for complete search history.

(56) References Cited

U.S. PATENT DOCUMENTS

| 12,039,695 | B1* | 7/2024 | Jiang ..................... G06T 15/005 |
| 2008/0143760 | A1* | 6/2008 | Ellis .......................... G06T 1/20 345/698 |
| 2012/0105452 | A1* | 5/2012 | Diard ....................... G09G 5/12 345/428 |
| 2022/0261958 | A1* | 8/2022 | Akkaraju .................. G06T 7/90 |
| 2024/0144430 | A1* | 5/2024 | Lin ..................... G06F 11/3062 |

FOREIGN PATENT DOCUMENTS

| EP | 4105877 A1 | 12/2022 |
| WO | 2022007862 A1 | 1/2022 |

OTHER PUBLICATIONS

Ahmet Oguz Akyuz, High Dynamic Range Imaging Pipeline on the GPU, Journal of Real-Time Image Processing, vol. 10, Jun. 2015, pp. 273-287.*

(Continued)

*Primary Examiner* — Jacinta M Crawford
(74) *Attorney, Agent, or Firm* — Workman Nydegger (57) ABSTRACT

Systems are configured for performing super-resolution processing for applications by a plurality of different hardware processing units that include hardware processing units that are native to the applications and hardware processing units that are non-native to the applications. Interfaces in the system generate different sets of instructions that are submitted to the different processing units with synchronization objects that synchronize the execution of the instructions.

19 Claims, 6 Drawing Sheets

(56) References Cited

OTHER PUBLICATIONS

International Search Report and Written Opinion received for PCT Application No. PCT/US2024/032467, (MS#413358-PCT01), Sep. 19, 2024, 13 pages.
International Preliminary Report on Patentability (Chapter I) received for PCT Application No. PCT/US2024/032467, mailed on Dec. 26, 2025, 8 pages.

* cited by examiner

METHODS AND SYSTEMS FOR MANAGING RESOLUTION CHANGES DURING IMAGE PROCESSING

BACKGROUND

With conventional image processing, it is possible to render images at a variety of display resolutions. This is particularly beneficial for enabling content that is saved at one resolution to be rendered at different resolutions on a plurality of different display devices having different display capabilities. For example, images that are saved at low resolutions can be upscaled to higher resolutions for display on high-resolution displays.

The upscaling of images is sometimes referred to as super-resolution processing. With super-resolution processing, a higher resolution image of a base image is generated by rendering the base image with a higher pixel density than the underlying base image. For example, a base image having a 2K resolution (1920×1080 pixel resolution) can be upscaled to a 4K resolution image (3840×2160 pixel resolution) by converting each of the pixels in the base image into four new upscaled pixels.

Super-resolution processes utilize specialized algorithms that are configured to generate outputs comprising new details for the newly upscaled pixels, which are not present in the underlying pixels, and such that the new upscaled pixels are not mere duplicates of the underlying base pixels from which they depend. By way of example, each of the new pixels in an upscaled image will usually contain a unique set of properties that are derived from some combination of the underlying base pixels' properties, as well as the properties of the neighboring pixels that are contained within the base image and, in some instances, the new pixel properties will also be based at least in part on the properties of other new neighboring pixels of the upscaled image.

Many different types of super-resolution algorithms and techniques can be used to upscale and enhance an image. For instance, some super-resolution processes can be used to smooth out the edges of the new pixels that are being generated. Some super-resolution processes can also be used to cause the final upscaled images to appear more detailed than the underlying images from which they are based. The super-resolution model algorithms can be tuned for different desired outcomes and styles by controlling algorithm weights applied to control variables or parameters of the algorithms that are based on attributes of the images being processed.

Recent developments in computer technologies include the creation of machine learning models that can be trained to perform various tasks, including upscaling and other forms of super-resolution image processing. Super-resolution machine learning models, for example, can be configured with one or more of the super-resolution processing algorithms that are trained to perform super-resolution processing on a particular type or class of lower-resolution images by applying the models to training data that comprises pairs of low-resolution and high-resolution images and in such a manner as to consistently generate images of a high-resolution based on inputs comprising low-resolution images, similar to the training data.

The subject matter claimed herein is not limited to embodiments that solve any disadvantages or that operate only in environments such as those described above. Rather, this background is only provided to illustrate one example technology area where some embodiments described herein may be practiced.

SUMMARY

Disclosed embodiments include systems and methods for managing image processing and, even more particularly, for selecting and managing image resolution changes for images that are being generated.

In some embodiments, systems are used to identify a selected display resolution that has been selected for rendering application images at an image rendering platform (e.g., a display device). The systems also select a super-resolution model for upscaling the application images to the selected display resolution. The super-resolution model has a target model input image resolution that is different from the selected display resolution and a target model output image resolution that is higher than the target model input image resolution.

The systems also identify a graphics processing unit (GPU) or other processing system that generates the application images. The GPU may be configured to generate images at different resolutions based on application instructions. Despite the default or preferred behavior of the application instructions, however, the systems cause the GPU to generate the application images with a GPU image output resolution that equals the target model input image resolution, even when the application instructions indicate that the GPU should generate the application images with a resolution that is different from the target model input image resolution (e.g., at a higher resolution).

Then, the systems cause the application images generated by the GPU at the target model input image resolution to be upscaled to the target model output image resolution (which is the same as the selected display resolution) by applying the super-resolution model to the application images that are generated by the GPU.

Finally, the systems transmit the upscaled application images to the display device for rendering.

In some instances, the systems first identify the rendering capabilities of the image rendering platform, including the capability of the image rendering platform to render images at a first resolution that is greater than or equal to a second resolution of images that the GPU is configured to generate for the application.

However, when the systems identify instructions from an application for the first GPU to generate images at the second resolution, the systems cause the first GPU to generate images for the application at a third resolution that is lower than the second resolution.

The systems also cause the images generated from the first GPU at the third resolution to be submitted to a secondary processing unit for further processing, including the upscaling of the images from the third resolution to either the second resolution or the first resolution. Then, the systems finally cause the upscaled images to be rendered at the image rendering platform.

According to these disclosed embodiments, a system can offload and distribute processing loads associated with image processing, so that the entire load associated with generated high-resolution images is not entirely carried by the primary GPU. It is also possible to leverage new technologies for enabling images to be rendered at selected display resolutions that may be higher than the resolutions that an application was initially created to be rendered at and/or that may be higher than the primary GPU is capable of generating images for at a desired performance level (e.g., at a desired frame rate). Performance of the GPU is improved by lowering the load on the primary GPU, by having it generate images at lower resolutions, and by sharing the load to neural processing units (NPUs) or secondary GPUs with trained machine learning modules that are configured to upscale images to the desired display resolution.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments include methods and systems for managing image processing and, even more particularly, for selecting and managing image resolution changes for images that are being generated.

As noted above, super-resolution machine learning models have been developed for performing super-resolution processing. It is also noted that machine learning models that perform super-resolution processing often rely on the processing power of a graphics processing unit (GPU) that is separate from, but connected to, the central processing unit (CPU) of the computing system. One reason that the image processing is offloaded to a GPU is that the processing load required to perform many machine learning tasks related to image processing, such as super-resolution processing, is too intensive to be executed by the CPU. In particular, it is noted that the CPU is already burdened with processing tasks associated with the execution of the operating system (OS) and the various applications running on the OS. So, when a game or other graphics-intensive application requires computationally expensive image processing, that processing is typically assigned to the GPU.

Some game developers code their software specifically for particular processor configurations, which can facilitate efficient processing. By way of example, a game may have code that is directed to a particular GPU. In other instances, a game may be coded with general-purpose GPU programming that is intentionally compatible with different GPUs, but which is subsequently compiled to be compatible for execution by a particular GPU.

During the execution of a software application, the computing system OS will route GPU image processing requests to the GPU that is native to the software that is being executed. The GPU may be considered native to the software being executed, for example, if the developer has coded the software specifically for that GPU configuration (e.g., a particular GPU manufacturer or GPU model).

A particular GPU can also be considered native to the software that is executing when the GPU has been pre-selected by OS default or user-directed input for that software during execution. By way of example, some operating systems have settings that enable a pre-selection of the GPU to be used for different applications, to accommodate different preferences (e.g., power savings or performance). The selection of the GPU to be used may be made by an OS default setting when the software is loaded for execution. Sometimes, OS interfaces are utilized to enable a user to pre-select the GPU that will be used for each application.

While the use of a GPU can significantly improve the performance of a system performing super-resolution, the performance improvements can be realized even more by utilizing a distributed set of different GPU(s) to perform the super-resolution processing. For instance, it is possible to distribute different tasks associated with image processing to different graphics processing units of the system, by having a primary GPU generate images at a lower resolution than the GPU is capable of generating. This takes a load off of the GPU, as the processing requirements to render low-resolution images are less than the processing requirements to render high-resolution images.

By distributing the upscaling load to another GPU or NPU with specialized machine learning modules, it is also possible to accommodate desired display resolutions, even for newly accessible display device capabilities. In particular, it is possible to identify and use machine learning modules with secondary GPU and NPU(s) that are configured to output images at newly developed display resolutions that did not exist when the applications that are now being rendered by the system were initially created. So, even though a legacy application may not specifically call for images to be rendered at enhanced resolutions that become available with new display device technologies, the disclosed systems can still render images at enhanced resolutions corresponding to the display capabilities of the connected display devices.

The disclosed systems utilize combinations of different processing units, for performing different image processing tasks. Some of these processing units may be considered primary processing units (e.g., a primary GPU) native to the application being executed. In particular, a hardware processing unit may be considered native to the application when the application includes code written in a language or format specific to the hardware processing unit and/or when the hardware GPU has been pre-selected by the OS running the application to perform the image processing instructed by the application. Various manufacturers of GPUs are capable of performing image processing and that may be referenced by an application or OS, such that they are native to the application. Some example GPU manufacturers include NVIDIA, Intel, and AMD. Applications may reference and/or be written with code specific to a GPU model that is considered native to the application.

When a computing system includes more than one hardware processing unit for performing image processing tasks (e.g., a primary GPU, as well as a secondary GPU and/or an NPU), the disclosed methods and systems may utilize an interface to selectively control the submission and synchronization of instructions for application workload tasks that are submitted to and executed by the different hardware processing units, including instructions that are submitted to and executed by hardware processing units that are considered non-native to the applications generating the application workloads.

Figure 1:
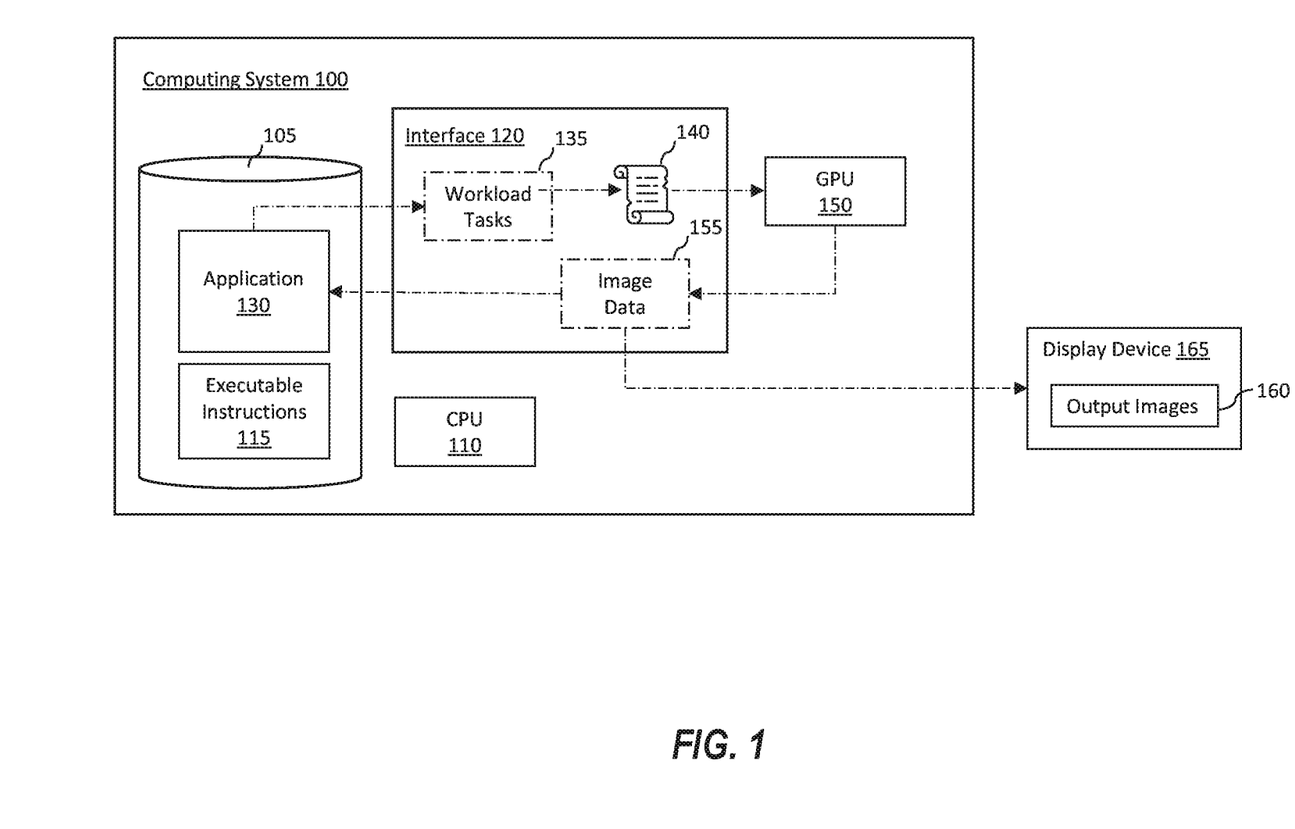
FIG. 1 illustrates an example of a computing system with a GPU performing image processing.

Attention is now directed to FIG. 1. As shown, a computing system 100 is configured with a storage device 105 and a processing system that includes a processor unit (e.g., CPU 110). This processing system is configured to execute stored computer-executable instructions 115 for implementing the functionality described herein, including the functionality performed by interface 120 for managing the submission and synchronization of sets of instructions that are routed to hardware processing units (e.g., GPU 150) to perform workloads created by applications running on the computing system 100, such as application 130 (e.g., a graphics-intensive software game).

As described below, interface 120 identifies workload tasks 135 associated with the execution of the application 130 and generates corresponding sets of instructions (e.g., set of instructions 140) for performing the workload tasks, such as image processing tasks, that are performed by hardware processing units, such as GPU 150. Interface 120 may be an application programming interface, for example, that defines calls and requests that can be made to the different hardware processing units connected through Interface 120, as well as the formats and conventions to use when making the calls and requests.

In some instances, interface 120 is connected to other APIs (not shown) that are specific to the GPU 150 and/or other components of the computing system.

In some instances, GPU 150 is native to the application, with the code of the application corresponding to image processing to be performed by the GPU being written in a format specific to a format required by the GPU. The GPU 150 may also be considered native to the application when the OS of the computing system (not shown), which is stored in storage 105 and executed by CPU 110 has pre-selected the GPU 150 for performing the image processing required by the application. This pre-selection can be made by the OS during the loading of the application, for example.

When application 130 is executed by the computing system 100, which includes the execution of the set of instructions 140 submitted to the GPU 150, image data 155 is generated for application 130. The image data 155 comprises output images 160 or instructions for rendering the output images 160 in a desired format and resolution on an image rendering system such as display device 165.

The display device 165 may be integrally connected to and a part of the computing system 100 (e.g., a laptop screen). Alternatively, the display device may be a separate device that is connected to the computing system 100 (e.g., a monitor, television, or other detached display). The connection between the computing system 100 and the display device 165 may be wireless and/or wired.

Figure 2:
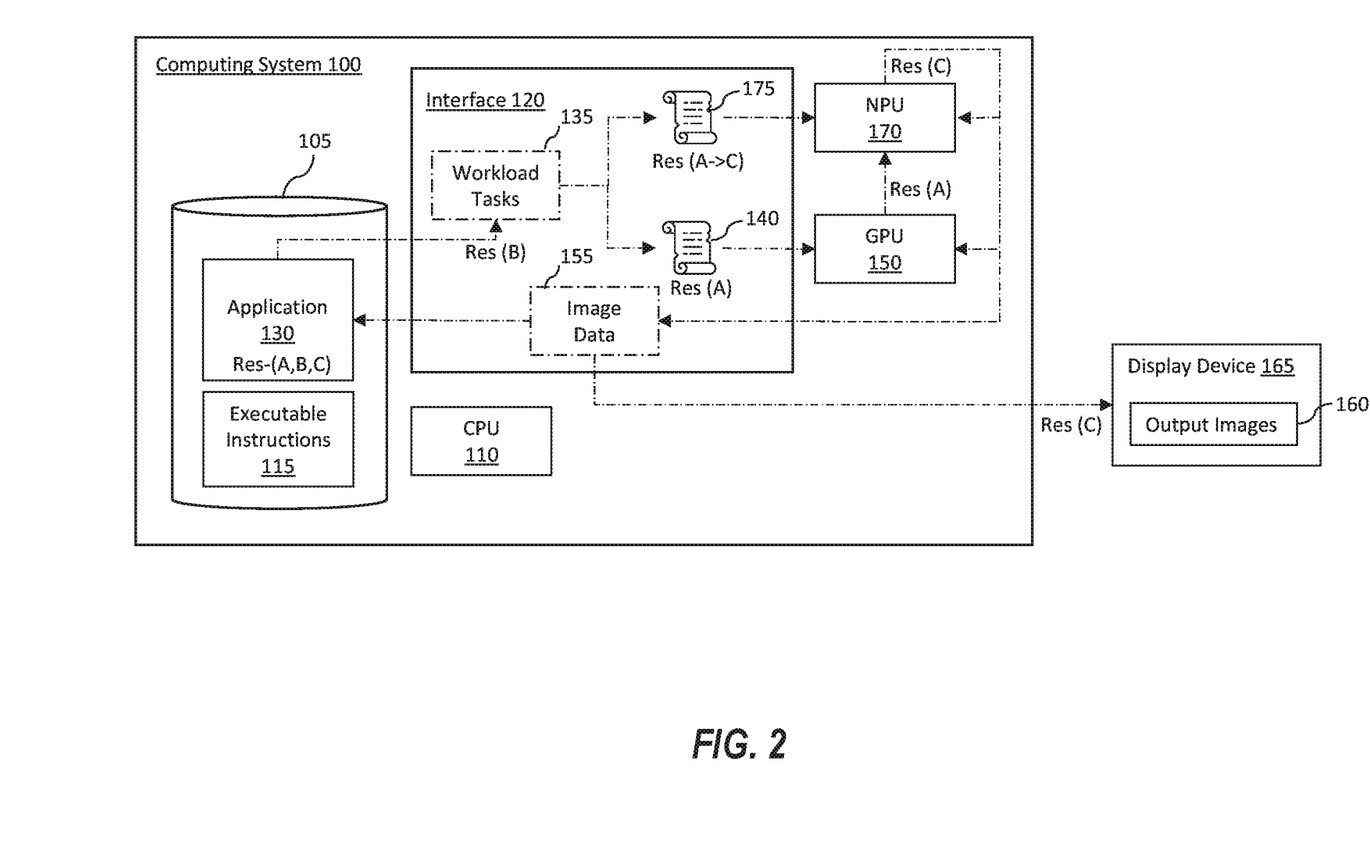
FIG. 2 illustrates an example of a computing system with a GPU and an NPU performing image processing.

In some instances, the computing system 100 includes multiple hardware processing units, as shown in FIG. 2, which may include the GPU 150 that is native to the application 130, as well as at least one non-native hardware processing unit (e.g., NPU 170).

The NPU 170 may comprise a specialized processing unit configured with a machine learning model that is trained for performing super-resolution. This super-resolution may include the restructuring of image data (e.g., low-resolution images) generated by the GPU into new image data (e.g., high-resolution images having a resolution that is higher than the low-resolution images). The machine learning models that are trained for performing super-resolution can be included in the stored executable instructions 115. They can also be integrated into separate storage contained within each corresponding processing unit.

A list of examples of super-resolution machine learning models that may be incorporated into and/or utilized by the NPU include the Laplacian Pyramid Super-Resolution network (LapSRN), the Fast Super-Resolution Convolutional Neural Network (FSRCNN), and Efficient Sup-Pixel Convolutional Neural Network (ESPCN).

The NPU 170 may also include other modules for performing image processing besides upscaling, such as antialiasing. Yet additional image processing that may be performed by the NPU 170, and/or the GPU 150, includes any processing that modifies or applies a particular style, format, orientation, coloring, contrast, brightness, filtering, masking, and/or other imaging transformation to images that are included in or defined by the image data 155 and that results in the output images 160 rendered on the display device 165.

In some instances, interface 120 identifies affinities of workload tasks for different hardware processing units based on attributes of the different hardware processing units. For example, the interface can identify that NPU 170 includes a machine learning model for performing super-resolution and/or other specialized image processing tasks. Such an identification can be made through declarations made by or for the NPU 170 when the drivers for the NPU 170 are installed and/or when the NPU 170 is connected to the computing system.

Then, when interface 120 detects a workload task of a particular type (e.g., super-resolution processing), interface 120 may identify and select a particular hardware processing unit, from a plurality of available and different hardware processing units, that has a greater capability for performing that task than other hardware processing units.

For example, interface 120 may identify NPU 170 is configured with one or more super-resolution processing models corresponding to a super-resolution processing workload task that GPU 150 is not specifically configured to perform, such that NPU 170 has a greater capability to perform that super-resolution task than GPU 150. This may be the case, even though NPU 170 is considered non-native to application 130. In particular, application code may be written in a format or language that is generic to GPUs or that is specific to GPU 150.

Once interface 120 identifies a workload task that is more appropriate for NPU 170 than GPU 150, the interface can generate a set of instructions 175 to be executed by NPU 170. The generation of the set of instructions 175 and/or the execution of the set of instructions 175 may include compiling the set of instructions 175 into a format that is recognized by and executable by NPU 170.

In some instances, the sets of instructions 140 and 175 that are generated for and routed to the GPU 150 and NPU 170, respectively, are transmitted to an API and/or queue specific to the different hardware processors.

When the image data 155 is processed by the different hardware processors (e.g., GPU 150, NPU 170) the image data 155 can be cached into buffers and volatile storage components of the storage 105. The individual hardware processors may also include cache storage that can be used during the processing of the image data 155.

The Interface 120 facilitates communications between the different hardware processors and other components of the computing system, as well as with the display device 165.

The interface 120 may also be used to override instructions that are initially received from application 130, such as instructions or requests for the system to generate or render application images for the application at a particular resolution. For example, if application 130 indicates that the application images should be rendered at a particular resolution (e.g., resolution (B)), interface 120 may determine that the application images should, instead, be rendered at a resolution other than resolution (B), at either a higher resolution or a lower resolution.

The determination made by interface 120 as to which resolution should be used for rendering the application images may be made automatically (e.g., based on detected configurations of the display device 165), or based on user instructions (e.g., settings established with the interface 120).

In some embodiments, the interface may coerce the application into requesting that images be rendered at a particular resolution by providing an alternative view of the system state and capabilities of the display device to the application. This alternative view may be considered an inaccurate statement or a lie, for example, about the display resolution capabilities of the display device. Then, when the application requests images to be generated at a particular resolution, based on application settings relative to display capabilities (e.g., display at a highest capable resolution of a connected display device), the application may request a particular resolution that is based on the alternative view information it receives from the interface.

Some additional examples will now be described with reference to FIG. 3.

Figure 3:
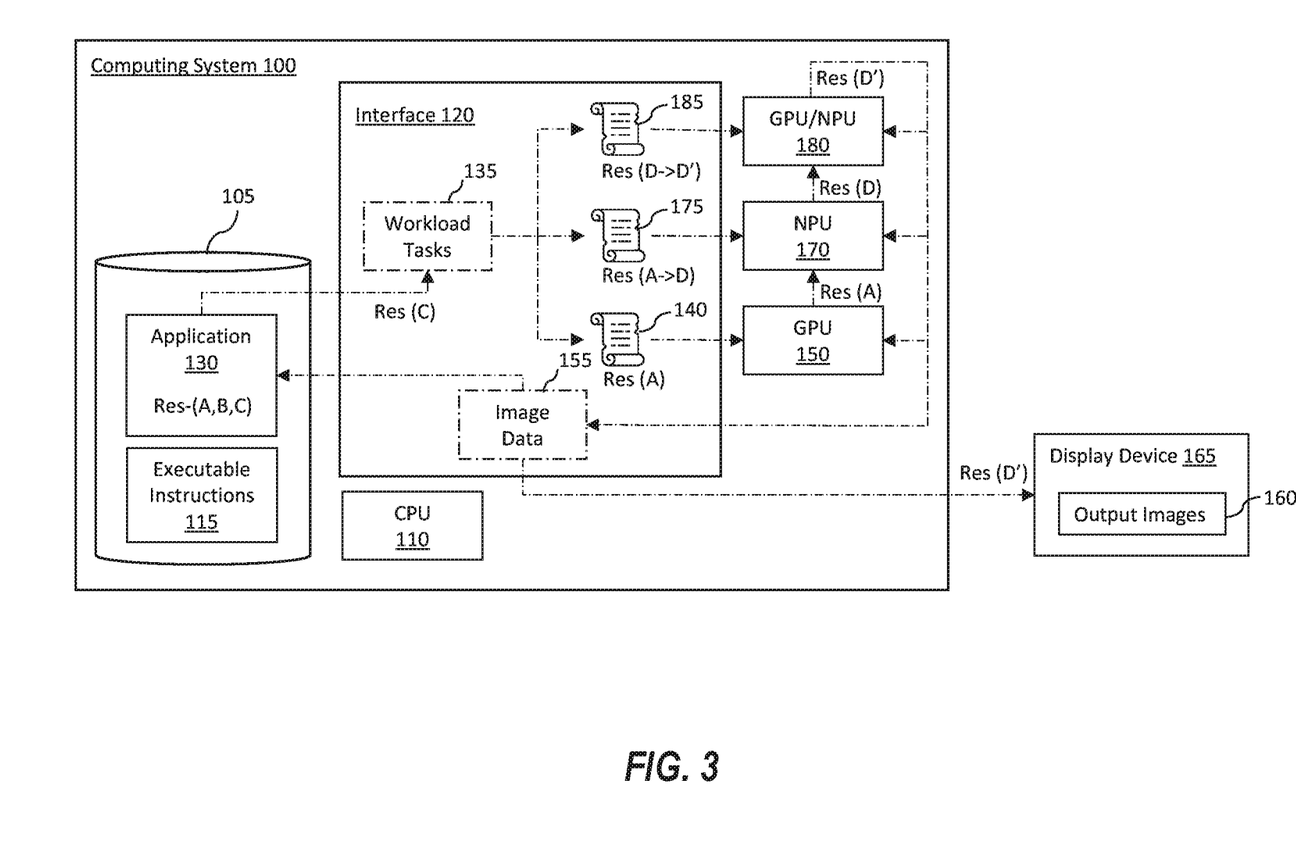
FIG. 3 illustrates an example of a computing system with a plurality of hardware processing units, including one or more GPU and NPU, performing image processing.

In the embodiment shown in FIG. 3, the computing system 100 includes multiple hardware processing units, including GPU 150, NPU 170, and another GPU/NPU 180. GPU/NPU 180 comprises either a secondary GPU or NPU, or a GPU having an NPU integrated within the GPU. The GPU/NPU 180 includes specialized neural processing models trained for performing specialized image processing tasks, such as super-resolution processing, stylizing, or other image processing (e.g., high dynamic range (HDR) transformations to widen a viewable color spectrum of the images, de-ghosting processes for removing artifacts and intensity distortions, shading, and coloring).

In this example, interface 120 may detect that display device 165 comprises display capabilities for rendering an image at a resolution that is higher than the resolution that application 130 is directing the computing system 100 to generate. Interface 120 may also determine that NPU 170 includes machine learning modules trained for upscaling images generated at a lower resolution by GPU 150 into the higher resolution that the display device 165 is configured to render images at.

The interface 120 may also determine that GPU 150 and GPU/NPU 180 are not configured with machine learning modules for making the same upscaling transformations but are capable of performing different imaging tasks. For instance, interface 120 may determine that GPU 150 is capable of or configured with modules for generating images at a first resolution and style specified by the application.

In this embodiment, the GPU 150 may be native to the application, wherein the GPU 150 is pre-selected as the default hardware processor for generating images for application 130. Although not required, the workload tasks 135 processed by the interface 120 may also include instructions formatted for execution by GPU 150.

The interface 120 may also determine that GPU/NPU 180 is configured with trained models for transforming images from a first style (e.g., an animation style specified by the application) into transformed images having a different style (e.g., a style specified by a user, such as a realistic style or a style that alters the animation style provided by the application into a different animation style that is more photo-realistic). For instance, a user may install a feature into their system which is connected to the interface and that enables a user to select different styles that can be applied to images generated by the system. This feature may be part of the GPU/NPU 180 or a driver, extension, or plugin that is connected to the GPU/NPU 180.

Accordingly, when a user selects a particular style to use for rendering images generated for the application, interface 120 can detect this user input and responsively generate instructions for the GPU/NPU 180 to transform images produced for application 130 into the desired style.

In some embodiments, interface 120 may detect or determine that an instruction has been received for rendering images for application 130 at a desired display resolution that is a higher resolution than the display device 165 is capable of rendering, even though the application workload tasks received from application 130 do not specify that requirement. This instruction can be detected, for instance, in response to user input entered at a menu or control associated with interface 120 (not shown).

In the current example, when a workload for application 130 is received by interface 120 with workload tasks 135 for generating images corresponding to a runtime implementation of application 130, interface 120 can split up and route different image processing tasks to the different hardware processing units corresponding to the different functionalities and affinities associated with each of the hardware processing units to cooperatively generate images at a desired display resolution.

In particular, interface 120 can generate a first set of instructions 140 for the GPU 150 to perform the image processing tasks associated with drawing the initial objects that will be included in the images, performing initial shading, and coloring, and generating the images at a first resolution specified by the application (e.g., resolution (A)).

The interface 120 can also generate a second set of instructions 175 for the NPU 170 to upscale the images generated by the GPU 150 from the first resolution (resolution (A)), into a second resolution (resolution (D) that is a desired display resolution), as well as a third set of instructions 185 for the GPU/NPU 180 to transform the images generated in the desired display resolution (resolution (D)) into a final set of images for display, having the transformed desired resolution (resolution (D')) images that are stylized or further transformed from resolution (D)). Resolution (D'), for example, may be an HDR formatted version of the resolution (D), which is used to generate image data 155 comprising application images having resolution (D') from images generated by NPU 170 in resolution (D).

The sets of instructions can be formatted into different formats and conventions that are compatible with the different hardware processing units. The process of formatting the sets of instructions may include compiling or reformatting the instructions from one format to a format that is specifically configured for and compatible with the hardware processing unit(s) receiving the instructions. In this regard, the different sets of instructions may be formatted differently for different GPU or NPU manufacturer protocols and conventions.

In some instances, the sets of instructions are configured as control lists that contain a plurality of individual instructions. In some instances, interface 120 also generates and includes synchronization objects within the sets of instructions. The synchronization objects may include, for example, a fence or signal script that creates a temporal or sequential dependency between the execution of instructions contained in different sets of instructions. For instance, a synchronization object may be used to delay the execution of the instruction set 175 sent to NPU 170 to transform a set of images from resolution (A) to resolution (D) until after confirmation is received that images having resolution (A) have been generated by GPU 150 in response to the instruction set 140.

As noted previously, the interface 120 may determine the final display resolution to be used for rendering the application images at an image rendering platform (e.g., display device 165). This determination can be made automatically, based on the configurations of the display device 165, based on default interface settings, and/or in response to user input.

Once the determination of the final display resolution is made, the system will identify one or more super-resolution models that are configured to generate target model output images with the final display resolution. These super-resolution models may be integrated into the hardware processing units (e.g., GPU 150, NPU 170, GPU/NPU 180) and/or the executable instructions 115 stored by the computing system 100.

Each of the super-resolution models is configured to upscale and/or otherwise transform an input image with a first resolution to an output image having a different (e.g., higher or transformed) resolution. By way of example, reference will now be made to FIG. 4, which illustrates a set of models 400. Each model in the set of models is configured with one or more super-resolution algorithms that are trained to transform input images with a first resolution into output images having a different resolution. Additionally, or alternatively, the models may include algorithms trained to transform the formatting of the input images being processed by the models from a first format to a second format (e.g., style, HDR configuration, shading, coloring, intensity).

Figure 4:
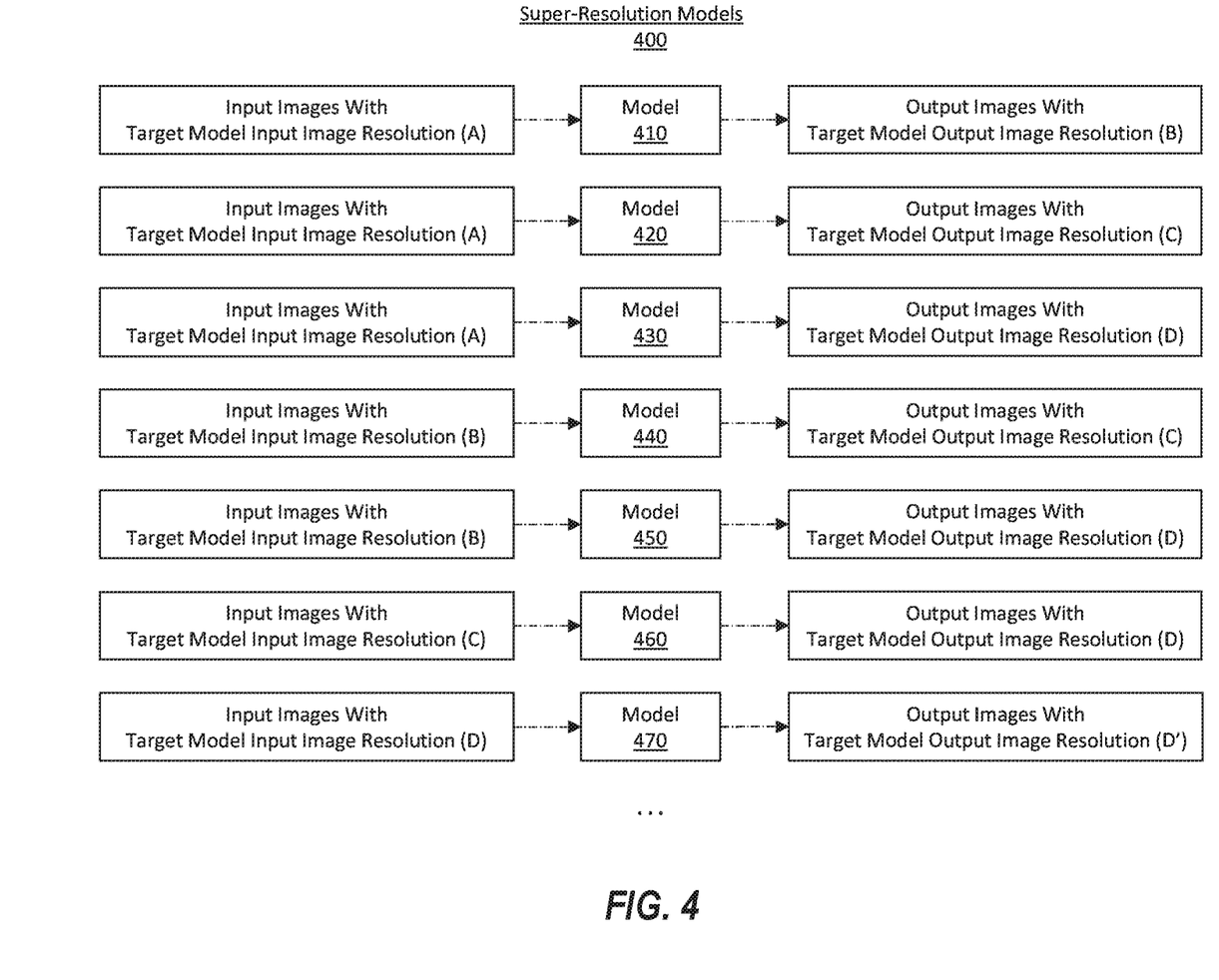
FIG. 4 illustrates an example of super-resolution models having target input image resolutions and target output image resolutions.

For further clarification, in the example of FIG. 4, model 410 may be configured with super-resolution algorithms that are trained to transform input images with a target model input image resolution (A) into output images having target model output image resolution (B), where resolution (B) is a higher resolution than resolution (A).

Model 420 may be configured with super-resolution algorithms that are trained to transform input images with a target model input image resolution (A) into output images having target model output image resolution (C), where resolution (C) is a higher resolution than resolution (A) or resolution (B).

Model 430 may be configured with super-resolution algorithms that are trained to transform input images with a target model input image resolution (A) into output images having target model output image resolution (D), where resolution (C) is a higher resolution than resolution (A) or resolution (B).

Model 440 may be configured with super-resolution algorithms that are trained to transform input images with a target model input image resolution (B) into output images having a target model output image resolution (C).

Model 450 may be configured with super-resolution algorithms that are trained to transform input images with a target model input image resolution (B) into output images having a target model output image resolution (D).

Model 460 may be configured with super-resolution algorithms that are trained to transform input images with a target model input image resolution (C) into output images having a target model output image resolution (D).

Model 470 may be configured with super-resolution algorithms that are trained to transform input images with a target model input image resolution (D), with a first format (e.g., style, HDR configuration), into output images having the same resolution but different formatting, represented in FIG. 4 as target model output image resolution (D').

The disclosed systems may include any combination of one or more of the referenced models and other models that include super-resolution processing capabilities, wherein each model is coded into and/or accessible to different corresponding hardware processing units (e.g., GPU 150, NPU 170, GPU/NPU 180). A single hardware processing unit may also include and/or have access to multiple different models.

In this example, each of the different target model input image resolutions and target model output image resolutions can be a resolution of 640×480 pixels, 1280×720 pixels, 1920×1080 pixels, 3840×2160 pixels (4k), 7680×4320 pixels (8k), or another resolution, wherein the target model output image resolution is a higher resolution than the target model input image resolution. Each set of input and output resolutions associated with a single model can also comprise the same or different formatting (e.g., style, coloring, intensity, HDR configuration, contrast, shading, or other formatting).

The various models shown in FIG. 4 (i.e., model 410, model 420, model 430, model 440, model 450, model 460, and model 470) may be integrated into or accessible by any of the hardware processing units (e.g., GPU 150, NPU 170, GPU/NPU 180).

When the system determines the desired display resolution to use for rendering application images (even if that is a different resolution than specified by the application), the system will identify and select a particular model that is configured to generate output images with the target model output image resolution that is the nearest to the desired display resolution, the particular model is selected from among a plurality of models that are configured to generate output images with different target model output image resolutions.

For instance, with regard to one example of FIG. 4, the system may identify a desired display resolution of 3840×2160 pixels (i.e., a 4k display resolution), which may be the same as the target model output image resolution (D). Accordingly, the system will identify and select model 430, model 450, and model 460 as potential candidate models to use for performing desired upscaling of the application images from the plurality of possible models because the target model output image resolution (D) matches the desired display resolution.

The system will then select from the set of candidate models based on other factors such as the current load on GPUs or NPUs that are associated with the models to select a hardware processing unit that has the available capacity to perform the upscaling at a desired level of performance without degradation. This determination can be based on evaluating a historical record of the different performance metrics of the different hardware processing units and/or based on current performance metrics being evaluated in real-time.

The selection of the model to be used can also be based on identifying which model will incur the relatively smallest processing load on the system from the set of candidate models. Alternatively, a random selection or a round-robin selection of the hardware processing model to be used from the initially selected candidate hardware processing units may be performed to distribute the work performed by the different hardware processing units over time, to preserve the life of the different components being used over time.

The selection of the model to be used may also be based on an affinity selection made by a user or the operating system for a particular manufacturer of a hardware component associated with the model being selected.

Once the system makes a final selection of the model to be used (e.g., model 430), the system identifies the target model input image resolution for that selected model (e.g., target model input resolution (A)). The system also generates instructions (e.g., set of instructions 140) for the primary GPU (e.g., GPU 150) to render images generated by the primary GPU at a resolution that is lower than it is capable of rendering and that matches the target model input resolution (e.g., resolution (A)) for the selected model that will be performing the super-resolution, which is model 430 in this example.

The system also generates instructions (e.g., set of instructions 175) for the processing unit (e.g., NPU 170) that is associated with the selected model to upsample the images from GPU 150 from resolution (A) to resolution (D).

The system may also generate additional instructions for the same or a different hardware processor (e.g., GPU/NPU 180) to perform a further transformation to the images rendered by NPU 170 to transform the images having resolution (D) to, instead, have a transformed resolution (D'), which is the same resolution of a different format.

Finally, the system may cause the images that have been upsampled to be rendered at the display device 165 as output images 160 having a resolution (D').

The foregoing example illustrates how image processing can be distributed among different hardware processing units and how the interface of the system can cause a primary GPU of the system to render images at a lower resolution (e.g., resolution (A)) than the application initially requests (e.g., resolution (C)) to reduce a load on the primary GPU.

This example also illustrates how the system can enhance the processing of the images so that the application images will be rendered at a display resolution (e.g., resolution (D')) that is higher than the requested resolution (e.g., resolution (C)), and perhaps with a different format than was initially requested (e.g., rendered with HDR formatting even though it was not requested by the application).

Figure 5:
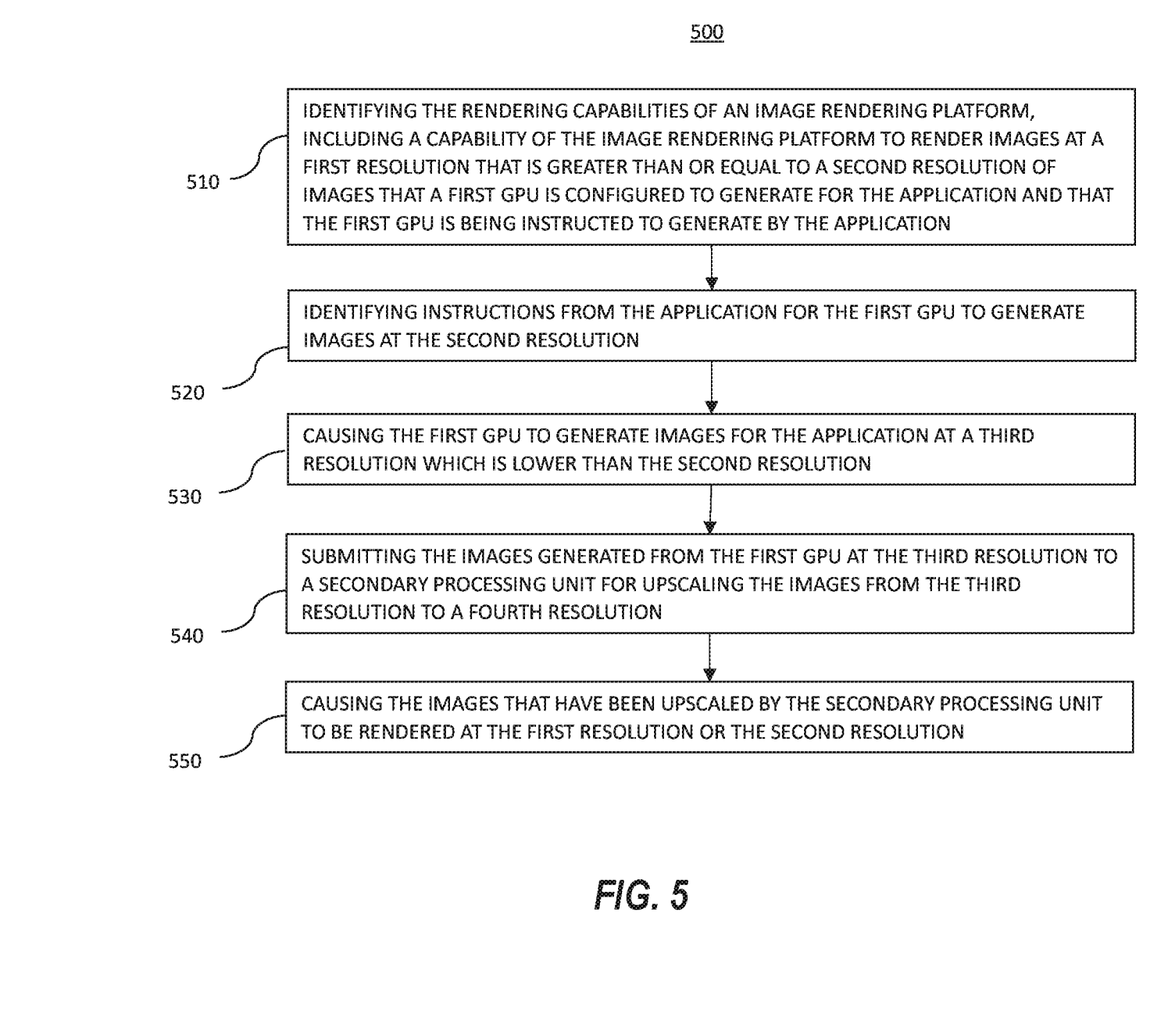
FIG. 5 illustrates an example of a processing flow associated with managing the resolutions of images that are selected and used to perform image processing.

Attention will now be directed to FIG. 5 which illustrates a flow diagram 500 of acts associated with methods for managing resolution changes during image processing. These acts may be performed by the computing system 100 in response to a hardware processing system (e.g., CPU 110) executing the stored executable instructions 115. The flow of FIG. 5 will be described in conjunction with the embodiment shown in FIG. 2.

As shown in FIG. 5, the first act includes the system identifying the rendering capabilities of an image rendering platform (e.g., the display device 165), including a capability of the image rendering platform to render images at a first resolution (e.g., resolution (C)) that is greater than or equal to a second resolution (e.g., resolution (B)) of images that a first GPU is configured to generate for the application (act 510) and that the first GPU is being instructed to generate by the application.

Act 510 may be performed during the installation of the display device 165 to the computing system 100, such as by querying the display device 165 for system capabilities and/or in response to input provided to the interface 120 from a user or the display device 165.

Act 510 act also includes identifying the first GPU (e.g., GPU 150), which may be based on the default settings of the computing system operating system, application instructions, and/or user inputs, as previously described.

Next, the system identifies instructions from the application for the first GPU (e.g., GPU 150) to generate images at the second resolution (e.g., resolution (B),) (act 520), which may be a lower resolution than the resolution (C) at which the display device is capable of rendering. In some instances, as previously mentioned, the interface may have coerced the application to request images to be displayed at the second resolution based on providing inaccurate display device capabilities to the application. (e.g., the application may be informed by the interface that resolution B is the highest resolution at which the display device is capable of rendering). The interface may make the decision to coerce the application to request a lower resolution than the GPU 150 is capable of generating for the display device to preemptively reduce the load on the GPU 150.

Act 510 may be performed when application 130 is being executed on computing system 100 and when instructions are generated by the application to render the application images. The resolution specified by the application instructions may be based on default settings of the application or a user-selected setting at an application setting interface that causes the application to override default settings, such as by providing inaccurate information to the application about the capabilities of the display device, for example.

Next, the system causes the first GPU to generate images for the application at a third resolution (e.g., resolution (A)), which is lower than the second resolution (e.g., resolution (B) (act 530). This third resolution is based on and matches the target model input image resolution associated with a super-resolution model that the system has identified and selected for generating images at a desired display resolution (e.g., resolution (C)). This desired display resolution can be determined and/or selected by interface 120 based on user inputs received at interface 120 and/or automatically based on detected settings and capabilities of the image rendering platform (e.g., display device 165) where the images will ultimately be rendered, as previously described.

Next, the system submits the images generated from the first GPU at the third resolution (e.g., resolution (A)) to a secondary processing unit (e.g., NPU 170) for upscaling the images from the third resolution to a fourth resolution that could be the second resolution (resolution (B), as specified by the application), or the first resolution (resolution (C), as identified as an enhanced resolution that the display device 165 is capable of displaying), or a resolution other than the second resolution or the first resolution (e.g., a resolution between the second resolution and the first resolution) (act 540).

In this embodiment, the secondary processing unit is selected by the system from among a plurality of different processing units based on identifying the model to be used by the secondary processing unit and which may be incorporated into the secondary processing unit.

In some instances, the secondary processing unit is selected from a plurality of different processing units based on a determination that the secondary processing unit is configured to perform upscaling on image inputs having the third resolution while another processing unit in the plurality of processing units is not configured to perform upscaling on the image inputs having the third resolution.

Next, the system causes the images that have been upscaled by the secondary processing unit (e.g., NPU 170) to be rendered at the first resolution (resolution (C), as identified as an enhanced resolution that the display device 165 is capable of displaying) or the second resolution (resolution (B), as specified by the application) (act 550). The system causes the images to be rendered at the image rendering platform (e.g., display device 165) by causing the NPU 170 to send the images directly to the display device 165.

Alternatively, the system may instruct the NPU 170 to route the images through one or more other processing units (including the first GPU) for further image processing before they are routed to the display device 165 for final rendering. This additional image processing may include, for example, auto high dynamic range (HDR) processing effects that modify the luminance of the image pixels to thereby alter a color range or the brightness of the image pixels in the application images. This processing may be performed before or after the upscaling of the images by the secondary processing unit.

In some instances, the distribution of image processing, including the instructing of the first GPU to generate images for the application at a lower third resolution than the resolution specified by the application is done automatically in response to detecting a load on the first GPU that exceeds a predetermined load threshold or in response to detecting a user-directed instruction to offload processing from the first GPU.

While the first GPU and the secondary hardware processing unit have been described as separate components thus far, they may be integrated into a single hardware processing unit that is integrally connected to a shared central processing unit (CPU). Either way, both the secondary processing unit and the first GPU are controlled by a single operating system (OS) running on the computing system 100 and that is included in the executable instructions 115.

Figure 6:
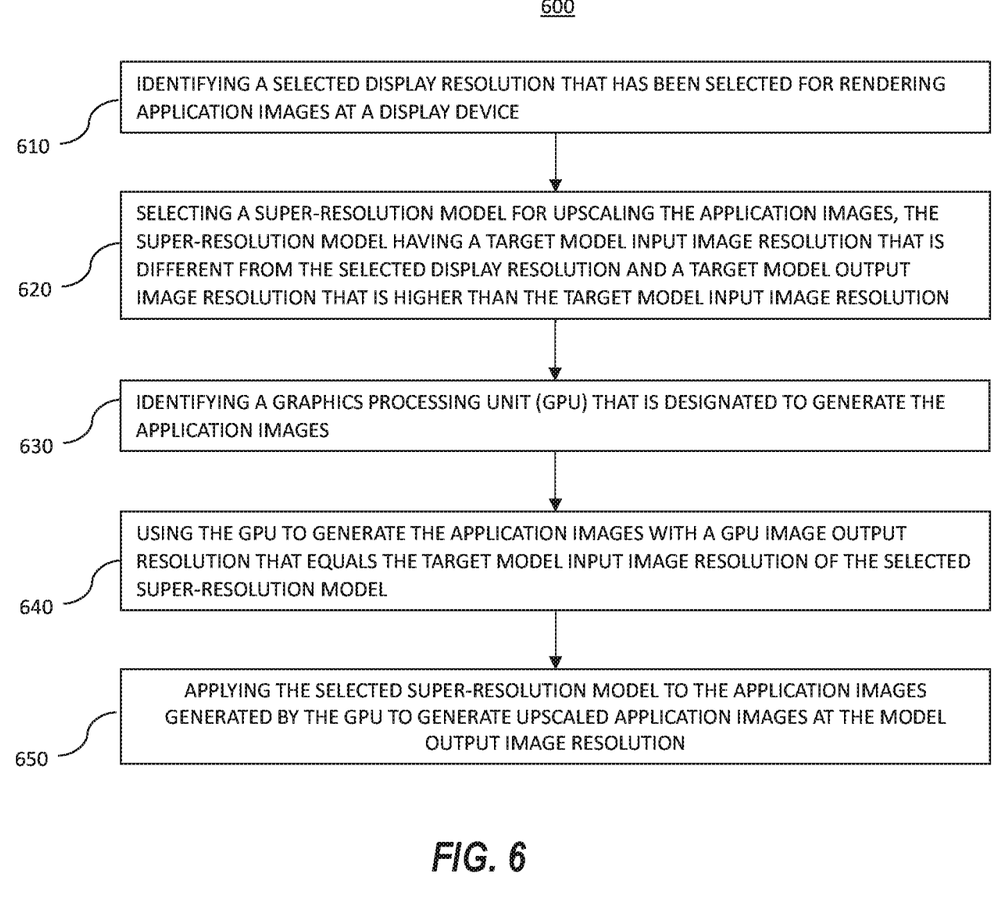
FIG. 6 illustrates another example of a processing flow associated with managing the resolutions of images that are selected and used to perform image processing.

Attention will now be directed to FIG. 6 which illustrates a flow diagram 600 of acts associated with related methods for managing resolution changes during image processing. These acts may be also performed by the computing system 100 in response to a hardware processing system (e.g., CPU 110) executing the stored executable instructions 115.

The first act includes the system identifying a selected display resolution that has been selected for rendering application images at a display device (act 610). As noted previously, this can be performed automatically, based on detected display device capabilities, default system settings, and/or based on user inputs. In some embodiments, this also includes selecting, based on the display capabilities of a display device, a display resolution for images of the application. The display resolution that is selected may be greater than or equal to the maximum output resolution of output images that the GPU is configured to generate for the application.

In some alternative embodiments, the selected display resolution is also based on instructions received from the application for the GPU, such that the selected display resolution comprises a desired resolution that the application has instructed the GPU to generate and that the display device is capable of rendering.

Next, the system selects a super-resolution model for upscaling the application images, the super-resolution model having a target model input image resolution that is different from the selected display resolution and a target model output image resolution that is higher than the target model input image resolution (act 620). In some instances, this includes selecting the super-resolution model from a plurality of different super-resolution models that each have a different target model output image resolution and based on the super-resolution model having a target model output image resolution that matches the selected display resolution.

The system also identifies a graphics processing unit (GPU) that is designated to generate the application images (act 630), such as a default or native GPU associated with rendering images for the application.

Next, the system causes the identified GPU to generate the application images with a GPU image output resolution that equals the target model input image resolution of the selected super-resolution model (act 640). This may include causing the GPU to generate images at a lower resolution than is being requested by the application or that was selected as the display resolution.

Then, the system applies the selected super-resolution model to the application images generated by the GPU to generate upscaled application images at the model output image resolution, which is the same as the desired or selected display resolution for rendering the images at the display device 165 (act 650). The selected super-resolution model may be applied by a secondary hardware processing unit (e.g., another GPU or an NPU) configured with or that is able to access the selected super-resolution model to perform the upscaling.

Thereafter, the system causes the images that have been upscaled by the secondary processing unit and super-resolution model to be rendered at the display resolution by the display device. This is performed, for example, by transmitting or submitting the upscaled images to the display device. This may also include transmitting instructions to the display device with the images to render the images at the selected and upscaled display resolution.

It will be appreciated that the disclosed methods may be practiced by a computer system comprising two or more processors and computer-readable media such as computer memory. In particular, the computer memory may store computer-executable instructions that when executed by one or more of the processors cause various functions to be performed, such as the acts recited in the embodiments.

Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions are physical storage media. Computer-readable media that carry computer-executable instructions are transmission media. Thus, by way of example, embodiments of the disclosure can comprise at least two distinctly different kinds of computer-readable media: physical computer-readable storage media and transmission computer-readable media.

Physical computer-readable storage media includes random access memory (RAM), read-only memory (ROM), programmable read-only memory (EEPROM), compact disk ROM (CD-ROM), or other optical disk storage (such as compact disks (CDs), digital video disks (DVDs), etc.), magnetic disk storage or other magnetic storage devices, or any other hardware storage devices which can be used to store desired program code in the form of computer-executable instructions or data structures and which can be accessed by a general purpose or special purpose computer.

When information is transferred or provided over a network or another communications connection (either hardwired, wireless, or a combination of hardwired or wireless) to a computer, as described herein, the computer properly views the connection as a transmission medium. Transmission media can include a network and/or data links that can be used to carry or desired program code means in the form of computer-executable instructions or data structures and which can be accessed by a general purpose or special purpose computer. Combinations of the above are also included within the scope of computer-readable media.

Further, upon reaching various computer system components, program code in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a network interface card (NIC)), and then eventually transferred to computer system RAM and/or less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosed embodiments may be practiced in network computing environments with many types of computer system configurations, including, personal computers (PCs), desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The disclosed embodiments may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for managing resolution changes during image processing, the method comprising:
    identifying rendering capabilities of an image rendering platform, including a capability of the image rendering platform to render images at a first resolution that is greater than or equal to a second resolution of images that a first GPU (graphics processing unit) is configured to generate for an application;
    identifying instructions from the application for the first GPU to generate images at the second resolution;
    causing the first GPU to generate images for the application at a third resolution that is lower than the second resolution;
    submitting the images generated from the first GPU at the third resolution to a secondary processing unit for upscaling the images from the third resolution to the second resolution or the first resolution, where the secondary processing unit is selected from a plurality of processing units, each of the plurality of processing units being configured with one or more super-resolution processing models, the selecting of the secondary processing unit being based on a determination that the secondary processing unit is configured to perform upscaling on image inputs having the third resolution while another processing unit in the plurality of processing units is not configured to perform upscaling on the image input having the third resolution; and
    causing the images that have been upscaled by the secondary processing unit to be rendered at the first resolution or the second resolution at the image rendering platform.

2. The method of claim 1, wherein the secondary processing unit comprises a GPU (graphics processing unit) that is non-native to the application.

3. The method of claim 1, wherein the secondary processing unit comprises an NPU (neural processing unit) configured for generating super-resolution images by upscaling images from the third resolution to the first resolution.

4. The method of claim 1, wherein the secondary processing unit comprises an NPU (neural processing unit) configured for generating super-resolution images by upscaling images from the third resolution to the second resolution.

5. The method of claim 1, wherein the method further comprises:
    causing the first GPU to generate images for the application at the third resolution in response to detecting a load on the first GPU that exceeds a predetermined load threshold.

6. The method of claim 1, wherein the method further comprises:

causing the first GPU to generate images for the application at the third resolution in response to a user-directed instruction to offload processing from the first GPU.

7. The method of claim 1, wherein the method further comprises:
applying additional image processing effects to the images generated by the first GPU at the third resolution prior to submitting the images to the secondary processing unit for upscaling the images from the third resolution.

8. The method of claim 7, wherein the additional image processing effects comprise auto high dynamic range (HDR) processing effects that alter a color range or a brightness of the image pixels by modifying a luminance of image pixels.

9. The method of claim 1, wherein the method further comprises:
causing the images that have been upscaled by the secondary processing unit to be further processed by the first GPU prior to final rendering.

10. The method of claim 1, wherein the first GPU and the secondary processing unit are both (i) integrated into a single hardware device, (ii) integrally connected to a shared central processing unit (CPU), and (iii) controlled by a single operating system (OS).

11. The method of claim 1, wherein the secondary processing unit upscales the images from the third resolution to the second resolution, the first resolution being equal to the second resolution.

12. The method of claim 1, wherein the secondary processing unit upscales the images from the third resolution to the first resolution, the first resolution being greater than the second resolution.

13. A method for managing resolution changes of application images during image processing, the method comprising:
identifying a selected display resolution that has been selected for rendering application images at a display device;
selecting a super-resolution model for upscaling the application images, the super-resolution model having a target model input image resolution that is different from the selected display resolution and a target model output image resolution that is higher than the target model input image resolution;
subsequent to the selecting of the super-resolution model, causing a graphics processing unit (GPU) to generate the application images with a GPU image output resolution that equals the target model input image resolution; and applying the super-resolution model to the application images generated by the GPU to generate upscaled application images at the target model output image resolution.

14. The method of claim 13, wherein the GPU is capable of generating images at resolutions that are higher than the GPU image output resolution.

15. The method of claim 13, wherein the GPU image output resolution is lower than the selected display resolution.

16. The method of claim 13, wherein the selected display resolution is selected by an application associated with the application images.

17. The method of claim 13, wherein the selected display resolution is automatically selected based on detected display capabilities of the display device.

18. The method of claim 13, wherein the method further comprises:
selecting the super-resolution model from a plurality of different super-resolution models that each have a different target model output image resolution and based on the super-resolution model having a target model output image resolution that matches the selected display resolution.

19. A method for managing resolution changes during image processing by a system that includes a graphics processing unit (GPU), the method comprising:
selecting, based on display capabilities of a display device, a display resolution for images from an application, the display resolution being greater than or equal to a maximum output resolution of output images that the GPU is configured to generate for the application;
identifying instructions from the application for the GPU to generate images;
causing the GPU to generate the images at an output resolution that is different than the display resolution;
submitting the images generated from the GPU to a secondary processing unit for upscaling the images to the display resolution, where the secondary processing unit is selected from a plurality of processing units, each of the plurality of processing units being configured with one or more super-resolution processing models, the selecting of the secondary processing unit being based on a determination that the secondary processing unit is configured to perform upscaling on image inputs having the output resolution; and
causing the images that have been upscaled by the secondary processing unit to be rendered at the display resolution.

* * * * *